US012531503B2

(12) United States Patent
Muther (10) Patent No.: US 12,531,503 B2
(45) Date of Patent: Jan. 20, 2026

(54) MOUNTING SYSTEM FOR PHOTOVOLTAIC MODULES AND COMPONENTS OF A MOUNTING SYSTEM FOR PHOTOVOLTAIC MODULES FOR IMPROVING INSTALLATION (71) Applicant: AEROCOMPACT Group Holding AG, Vienna (AT)

(72) Inventor: Mathias Muther, Rons (AT)

(73) Assignee: AEROCOMPACT Group Holding AG, Vienna (AT)

( * ) Notice: Subject to any disclaimer, the term of this patent is extended or adjusted under 35 U.S.C. 154(b) by 287 days.

(21) Appl. No.: 18/142,712

(22) Filed: May 3, 2023

(65) Prior Publication Data
US 2024/0162849 A1    May 16, 2024

(30) Foreign Application Priority Data

May 5, 2022    (DE) .................... 20 2022 102 464.2

(51) Int. Cl.
H02S 20/23    (2014.01)
F16B 9/02    (2006.01)
H02S 30/10    (2014.01)

(52) U.S. Cl.
CPC .............. *H02S 20/23* (2014.12); *F16B 9/02* (2013.01); *H02S 30/10* (2014.12)

(58) Field of Classification Search
CPC .......... H02S 20/23; H02S 30/10; H02S 30/00; H02S 20/24; F16B 9/02; F24S 25/10; F24S 25/632; F24S 25/65; F24S 2020/14; F24S 2025/02
See application file for complete search history.

(56) References Cited

U.S. PATENT DOCUMENTS

| 8,528,277 | B2 * | 9/2013 | Schwarze | F24S 25/634 |
| | | | | 52/173.3 |
| 9,341,201 | B2 * | 5/2016 | McPheeters | H02S 20/30 |
| 10,429,100 | B2 * | 10/2019 | Zabel | F16B 2/005 |
| 11,979,109 | B2 * | 5/2024 | Muther | H02S 30/00 |
| 2011/0100422 | A1 * | 5/2011 | Schwarze | F24S 23/77 |
| | | | | 136/246 |

(Continued)

FOREIGN PATENT DOCUMENTS

DE    202006009884 U1    8/2006
DE    102008052418 A1    4/2010

(Continued)

*Primary Examiner* — Rodney Mintz
(74) *Attorney, Agent, or Firm* — Bachman & LaPointe, P.C.

(57) ABSTRACT

A connection element for bottom profile rails of a mounting system for photovoltaic modules, includes a base body (12) realized as a U-profile rail and having two parallel side legs (13) and a connection section (14), wherein both side legs (13) have a projection (16) on a free end (15) facing away from the connection section (14), the projection (16) being realized with the base body (12), wherein, in the mounted state, the side legs (13) are guided in channel sections (26) of the bottom profile rail (05) in such a manner that a wall of the channel sections (26) runs above the free ends (15) of the side legs (13), wherein the projection (16) is realized in such a manner that it does not project at the top beyond the wall of the channel sections (26) in the mounted state.

18 Claims, 6 Drawing Sheets

(56) References Cited

U.S. PATENT DOCUMENTS

2013/0111713 A1    5/2013  McPheeters
2018/0031278 A1*   2/2018  Zabel ...................... F24S 25/67
2023/0095008 A1*   3/2023  Muther ................... H02S 30/00
                                                             269/189

FOREIGN PATENT DOCUMENTS

DE    102010002832 A1    1/2014
DE    102012108138 B4    8/2016
DE    102021104862 A1    9/2022
EP         1783440 A2    5/2007

* cited by examiner

MOUNTING SYSTEM FOR PHOTOVOLTAIC MODULES AND COMPONENTS OF A MOUNTING SYSTEM FOR PHOTOVOLTAIC MODULES FOR IMPROVING INSTALLATION

BACKGROUND OF THE INVENTION

A plurality of mounting systems for photovoltaic modules is known from the state of the art. The systems differ depending on the installation location or mounting location of the system, for example for flat roofs or gable roofs. For a plurality of mounting systems, a basic concept has been established in which several rows of bottom profile rails are used to which the photovoltaic modules are fixed via corresponding holding elements, preferably in the form of supports. To the several rows of bottom profile rails, often, transverse rails or rail transverse connectors running at right angles to these rows are added, said transverse rails or rail transverse connectors ensuring the orientation and spacing of the bottom profile rails, guaranteeing the mechanical stability and/or supporting the securing of ballast elements.

In the known mounting systems, in a plurality of cases, bottom profile rails with different lengths are used in order to provide or realize the total length of the system to be mounted by correspondingly piecing together bottom profile rails having different lengths with as few bottom profile rails as possible. Realizing a mounting system having a minimum of or relatively few individual bottom profile rails in one row leads to the advantage that relatively few transitions of bottom profile rails are produced. This, in turn, has the advantage that, at relatively few transitions, the thermal expansion of the bottom profile rails in the transition area has to be taken into account, for example by providing connection elements having a movable bearing.

At the same time, however, this leads to the disadvantage that, already for the bottom profile rails, many different parts have to be manufactured and procured, stocked and also transported by the fitter who uses or installs the mounting system. Not least, the transport of bottom profile rails having a length of more than 2 meters can turn out to be complex, complicated and expensive for different means of transport.

Further disadvantages of known mounting systems are realized by the holding elements for fixing or connecting the photovoltaic modules to the bottom profile rails and by transverse rails. In the case of the first-mentioned holding elements, for mounting the most diverse photovoltaic modules and for mounting them both in the longitudinal direction and the transverse direction, it is indeed known to provide the holding elements with a movable, in particular pivotable, rocker part such that the most different angles or orientations of the modules with respect to the bottom profile rails can be achieved when mounting the photovoltaic modules. It is true that this makes the known holding elements relatively well useable for different photovoltaic modules having different dimensions and in the case of different orientation (longitudinal mounting or transverse mounting), but it equally entails a high effort for the fitter or installer, since the corresponding movability or pivotability of the rocker parts or rocker elements has to be handled when mounting or fixing the photovoltaic modules to the holding elements. In this process, in particular, an unintentional tilting of the rocker parts or rocker elements into an extreme position or a stop position leads to increased mounting effort.

With regard to the rail transverse connectors of known systems, it has become apparent that it is true that the known systems in principle also allow an adaptability to different distances of transverse bottom profile rails, but that this adaptability is complicated and does not allow or make possible or hardly allows or hardly makes possible a pre-mounting.

SUMMARY OF THE INVENTION

Based on the aforementioned state of the art, the object of the present invention is to propose a mounting system for photovoltaic modules and components of such a mounting system, in particular a connection element for bottom profile rails, a bottom profile rail system, holding elements and rail transverse connectors, which overcome the disadvantages in the state of the art.

With regard to the connection element for bottom profile rails of a mounting system for photovoltaic modules, this object is attained with the features disclosed herein. With regard to a bottom profile rail system of a mounting system for photovoltaic modules, this object is also attained with the features disclosed herein. Regarding holding elements of a mounting system for photovoltaic modules for fixing a photovoltaic module to a bottom profile rail or a row of bottom profile rails, the object defined above is also attained with the features disclosed herein. Regarding the rail transverse connectors of a mounting system for photovoltaic modules for the transverse connection of bottom profile rails which are disposed in rows, the object defined at the beginning is attained with the features disclosed herein. With regard to a mounting system for photovoltaic modules, this object is attained with the features disclosed herein.

Advantageous embodiments further disclosed herein and are the subject matter of the dependent claims, the subsequent description and the description of the figures. All features disclosed below with respect to the device are also to be regarded as disclosed with respect to the method.

The connection element according to the invention for bottom profile rails of a mounting system for photovoltaic modules comprises, according to the invention, a base body which is preferably made of a metal and which is realized as a U-profile rail and has two parallel side legs and a connection section, wherein both side legs have a projection on a free end facing away from the connection section, said projection being realized preferably monolithically with the base body, wherein, in the mounted state, the side legs are guided in channel sections of the bottom profile rail in such a manner that a wall of the channel sections runs above and preferably adjacent to the free ends of the side legs, wherein the projection is realized in such a manner that it does not project at the top beyond the wall of the channel sections in the mounted state.

With the connection element according to the invention, it is realized in a particularly advantageous manner that, on the one hand, a movable bearing can be formed or realized between adjacent bottom profile rails and that, at the same time, the transition between two adjacent bottom profile rails, including the connection element disposed between the bottom profile rails for connection, does not impair or even prevent the arrangement or fixation of other components of the mounting system, in particular the arrangement of holding elements. In addition, it is achieved in a particularly advantageous manner that, on the one hand, the transitions between adjacent bottom profile rails are not lost or excluded as a mounting location or arrangement point for holding elements and that, additionally, movable bearings for the compensation of thermal expansion can also be provided between a correspondingly large number of bottom profile rails without effort and technical limitation.

In a particularly advantageous manner, this, in turn, results in the fact that a minimum number of different bottom profile rails, in particular different lengths of bottom profile rails, is sufficient for the corresponding mounting system, which indeed entails that, in total, more individual bottom profile rails have to be laid or mounted and provided with connectors or connection elements, but which, at the same time, results in the fact that correspondingly short bottom profile rails, for example with a maximum length of 2 meters, can be used, which, on the one hand, are more easily and cost-efficiently transportable and, moreover, significantly reduce the requirement for procurement, transport and storage for the contractor carrying out the mounting.

The particularly advantageous use also of the transition area between adjacent bottom profile rails, for example for the arrangement of holding elements, is achieved according to the invention in that the projection, which is preferably used on one side or on a bottom profile rail to realize or produce a stop, does not project onto the upper side or other areas of the bottom profile rail which are used for the arrangement or fixation of holding elements or other components of the mounting system. Thus, via the projection, a stop can be produced on one side or adjacent to a bottom profile rail, said stop producing a defined position relative to a bottom profile rail. In this case, on a second side of the projection on which no stop has been produced with a bottom profile rail, a gap or a distance for the next, adjacent bottom profile rail can be produced or set during the initial mounting via suitable means, which will be further discussed below, or also by hand such that a corresponding movable bearing is then provided for the compensation of thermal expansions of the bottom profile rails.

Furthermore, it is particularly advantageous that the connection element, preferably including the projection and the side legs and the connection section, can consist of a one-piece or monolithic component which can be manufactured, for example, as a bent part from a sheet metal or a similar flat or plate-shaped base material.

A formation of metal has the particular advantage that not only the mechanical stability is guaranteed, but also that the electrical properties, in particular with regard to the lightning strike capability, are given between the bottom profile rails which are, in particular, also made of metal.

According to a first advantageous embodiment of the connection element, the free end of the side legs may have a mark, in particular a notch, on one side, preferably on both sides, in a longitudinal direction at a predetermined distance from the projection.

In this way, the mounting, in particular the connection of two bottom profile rails via a corresponding connection element, can additionally be facilitated in a particularly advantageous manner. In the present embodiment, it can be made possible that, on one side, as described above, the projection is inserted into a bottom profile rail in a longitudinal direction up to a stop of a channel section, preferably an upper side of a channel section, and that the second bottom profile rail is pushed onto the connection element only until one end of the bottom profile rail reaches the mark, in particular the notch, on the still free side of the projection during the initial installation or initial setup of the mounting system. Therefore, it can be particularly advantageous to provide the mark, in particular the notch, on both sides of the projection in order to guarantee a mounting on both sides or an invariance of the mounting of the connection element in the longitudinal direction, even if, in use, only one mark is used as a predetermination of a distance or gap of the adjacent bottom profile rails. Particularly advantageously, the distance between the projection, in particular the end of the projection, and the mark in the longitudinal direction, in particular the notch, can be dimensioned in such a manner that it is greater than the expectable thermal expansion of the bottom profile rail, in particular including a corresponding tolerance.

Also in this respect, the connection element according to the invention and the mounting system according to the invention benefit from relatively short bottom profile rails having a length of 2 meters or less. For, in this case, the distance between the projection or the end of the projection and the mark can also, with a high degree of probability, have a general validity for all bottom profile rails and, thus, surely and reliably provide a corresponding movable bearing or a corresponding compensation of the thermal expansion of the bottom profile rails.

According to another, particularly preferred embodiment of the connection element, the base body may have a receiving opening or receiving indentation in end sections of the side legs in the longitudinal direction, said receiving opening or receiving indentation serving to receive a clasp element. The receiving opening or receiving indentation is a means, which is simple to realize in terms of structure, for receiving a clasp which is, for example, designed as a separate component or a clasp element which is designed as a separate component. Said clasp element will be discussed in more detail in the context of the following embodiment. Basically, the clasp element serves to electrically contact adjacent bottom profile rails via the connection element. Accordingly, the clasp element is preferably made of a metallic material or has at least partially an electrical conductive surface which enables an electrically conductive contact to the connection element. However, the clasp element can also contribute to mechanically secure or fix the connection element to or in said bottom profile rails.

According to a further advantageous embodiment, the receiving opening or receiving indentation may extend from the free end of the side legs in the direction of the connection section, preferably as a slit. This allows both a simple realization of the receiving opening or receiving indentation and a simple reception or mounting of the clasp element on or in the connection element and, thus, facilitates overall both the pre-mounting and the final mounting of the mounting system.

In a further, also preferred embodiment of the connection element, a clasp element inserted into the receiving opening or receiving indentation and projecting in a width direction at least partially beyond the side legs with elastically deformable side parts, in the mounted state, may provide a pressing of the side parts on the bottom profile rail, preferably the channel sections, due to a deformation of the side parts by means of the bottom profile rail.

Since the clasp or the clasp element at least partially projects laterally or in the width direction beyond the side legs and due to the corresponding realization of channel sections, which are only slightly wider in the width direction than the width of the side legs of the connection element, on sides of the bottom profile rail, it can be achieved by means of the connection element having the clasp element inserted therein and its at least partial projection of the side parts in the width direction that, when the connection element enters or is inserted into the channel section of a bottom profile rail, the side parts are pressed on the bottom profile rail, preferably the channel sections, such that, on the one hand, an electrical contacting, for example in the manner of a sliding contact, and/or a mechanical securing or a mechanical clamping in the channel section or in the bottom profile rail is achieved via the clasp element.

A bottom profile rail system of a mounting system according to the invention for photovoltaic modules, comprising at least two rows of bottom profile rails serving for the fixation of holding elements for holding photovoltaic modules, wherein each row of bottom profile rails comprises at least two bottom profile rails, attains the abovementioned object in an inventive manner in that a connection element according to any one of the embodiments described above is disposed between each two adjacent bottom profile rails. In this case, the bottom profile rail system can, as indicated above, particularly preferably have in each row a plurality of relatively short bottom profile rails, for example with a standardized length of 2 meters, and possible end pieces cut to a correspondingly shorter length, such that the transport of the bottom profile rails from the place of manufacture, via intermediaries, mounting companies to the installation location or mounting location is considerably facilitated and made possible at very low cost. In this case, via the connection elements described above, it can be ensured that, despite the relatively high number of transitions between adjacent bottom profile rails per row, an almost unhindered or unlimited arrangement of holding elements for fixing or connecting bottom profile rails on one side and photovoltaic modules on the other side is made possible. For this purpose, the bottom profile rails preferably have a mounting channel or mounting channel section that serves for the fixation of the holding elements. The mounting channel section can preferably be arranged in the center or centrally on the bottom profile rail. Further channel sections can be provided or realized laterally adjacent to the mounting channel section, preferably symmetrically on both sides, said channel sections also serving to receive the connection elements, for example.

Advantageously, two connection elements may be disposed at each transition between two bottom profile rails, preferably each on one side of a central mounting channel or mounting channel section.

In an advantageous embodiment of the bottom profile rail system, in the state of an initial mounting, the connection element may be disposed in such a manner that the projection adjoins in a flush manner with a bottom profile rail on one side in the longitudinal direction and that, on the other side of the projection, a bottom profile rail is disposed at a distance from the projection in the longitudinal direction, wherein, particularly preferably, said bottom profile rail ends at or in the area of a mark, in particular a notching, of the connection element. In this way, a simple mounting of the bottom profile rail system is made possible in a particularly simple and effective manner, and, at the same time, a movable bearing between adjacent bottom profile rails is realized in a simple and effective manner, which both takes into account and makes possible the thermal expansion of the bottom profile rails and, at the same time, does not render the transitions of adjacent bottom profile rails unusable for the arrangement or fixation of holding elements.

In a further, particularly preferred embodiment of the bottom profile rail system, a removable distance gauge which is positioned on one side of the projection on or at the connection element during the initial mounting and is an auxiliary stop for a bottom profile rail may be provided in order to ensure a predetermined distance between the projection of the connection element and an adjacent bottom profile rail in a longitudinal direction. Thus, the removable distance gauge can ensure that a distance is maintained between the end of the projection and the next, adjacent bottom profile rail on one side of the projection, said distance then, subsequent to the initial mounting, achieving or ensuring the compensation of the thermal expansion of the bottom rails.

The object defined above is with regard to a holding element of a mounting system for photovoltaic modules for fixing a photovoltaic module to a bottom profile rail or a row of bottom profile rails, said holding element having a base element for being connected to a bottom profile rail and a rocker element, which is mounted with respect to the base element so as to be pivotable about a pivoting axis, for being connected to the photovoltaic module, preferably in a peripheral area or corner area, of a photovoltaic module, attained in an inventive manner in that a preload element is provided which interacts with the base element and the rocker element in such a manner that, when the rocker element is accelerated only by the weight, a rotation of the rocker element with respect to the base element is prevented and that, in case of an additional acceleration, in particular by an application of a force by hand or without tools, an adjustment, in particular a stepless adjustment, of the rocker element with respect to the base element is made possible.

Thus, with the invention intending a realization of the preload element, it can be achieved that the advantages of a variable angle of the rocker element with respect to the base element, which in principle allows a mounting of differently dimensioned photovoltaic modules and of different orientations of the photovoltaic modules, also enable a simple and secure mounting or pre-mounting in a particularly advantageous manner. Thus, for example, during the initial mounting, one holding element or several holding elements can be disposed on and fixed to one bottom profile rail or several bottom profile rails and, as part of this or subsequent to the fixation, a pre-orientation of the rocker elements, for example without tools, can be performed, which is then maintained. Due to this pre-orientation, preferably by hand or without tools, which is maintained or not lost subsequent to the pre-orientation due to the preload element, a particularly simple and effective mounting or connection of the rocker element to the photovoltaic modules can be produced subsequently. Thereby, the mounting effort is decreased and mounting personnel is reduced.

According to a first advantageous embodiment of the holding element, the preload element may be designed in such a manner that a clamping effect is exerted at least on the rocker element. By means of a corresponding clamping, the force magnitude, torque magnitude or momentum magnitude can be predetermined or set particularly well and accordingly advantageously, said force magnitude, torque magnitude or momentum magnitude temporarily being required to effect an adjustment of the rocker element by overcoming the clamping effect or corresponding clamping forces.

In a further, particularly preferred embodiment of the holding element, the preload element may be disposed concentrically to the pivoting axis about which the rocker element is pivotable with respect to the base element. On the one hand, the concentric arrangement facilitates the manufacture and mounting of the holding element itself and can, additionally, also exert a particularly simple clamping effect or other restraining effect on the base element and/or the rocker element in order to guarantee the required securing in an essentially force-free state.

Especially preferably, a preload element may be disposed on both sides on a pivoting axis. By means of at least two preload elements disposed on opposite sides of the pivoting axis, the clamping forces or restraining forces can be distributed in a particularly advantageous manner on the base element and/or the rocker element.

According to a further advantageous embodiment of the holding element, the preload element may be provided radially circumferentially about the pivoting axis. Thereby the generated holding forces, clamping forces or other restraining forces can be transmitted particularly well to a relatively large area, such that a particularly secure restraining or clamping can be achieved even with manufacture-related tolerances of the components involved, in particular the base element and the rocker element.

Particularly advantageously, the preload element can be manufactured as a rubber ring, a disc spring or as a spacer made of plastic, which, on the outside, is placed on one or both sides on a pivoting axis, for example a bolt for realizing the pivoting axis, and, advantageously, by producing an axial force component along the pivoting axis, for example by tightening a screw nut on one end of the bolt, produces a clamping effect or restraining effect by being pressed on the base element and/or rocker element in the axial direction.

The object defined above is attained with respect to a rail transverse connector of a mounting system for photovoltaic modules for the transverse connection of bottom profile rails which are disposed in rows, said rail transverse connector comprising a pair of angle rails which are inserted into each other in a longitudinal direction of the rail transverse connectors, in that the angle rails have a fixedly predetermined fixing device in end areas each situated on the outside for the connection to a bottom profile rail and in that a variable overlap of the angle rails which are inserted into each other for predetermining the length of the rail transverse connectors is set by means of a fixing element for fixing the relative position of the angle rails to each other in the area of the overlap situated on the inside in the longitudinal direction.

The angle rails can be realized as bent parts, for example. In a first example, the fixedly predetermined fixing device on an end side can be realized as a recess or circular hole for the passage of a screw for the connection to a bottom profile rail or a corresponding bolt. However, more complex or complicated fixing devices can also be provided in the outer areas of the angle rails on the end sides. The basic idea of the invention is based on the fact that the fixing devices are fixedly predetermined in the outer end areas of the angle rails and that, thus, unlike in the state of the art, setting the rows of bottom profile rails to different distances is not set via the fixing devices on the end sides on the outside, but that the fixedly predetermined fixing devices on the end sides and on the outside are connected to the bottom profile rails according to their predetermined design and that, instead, setting the rows of bottom profile rails to different distances is not carried out on the outside or on the end sides, but in the longitudinal direction of the rail transverse connectors on the inside.

For this purpose, the rail transverse connector of the present invention provides an overlap realized in the transition of the two angle rails which are inserted into each other, said overlap initially being variable and allowing rows of bottom profile rails to be set to a determined distance, wherein the variable overlap is fixed by means of a fixing element after rows of bottom profile rails have been correspondingly set to a distance and, thus, also to a corresponding distance of the predetermined outer fixing devices on the end sides such that, due to the fixing element and its fixation of the relative position of the angle rails to each other, the length of the overlap or the dimension of the overlap is set and, thus, ultimately also the length of the rail transverse connector and/or the distance of the predetermined fixing devices is predetermined.

Thereby, the rail transverse connector can be set particularly effectively and easily to a corresponding distance of adjacent rows of bottom profile rails. In this case, it is particularly advantageous that, by means of the inner overlap and the fixing element disposed there for the fixation of the relative position of the angle rails, due to a fixation of the overlap of the angle rails, a particularly simple and effective pre-mounting of the rail transverse connectors before a final mounting or connection on or to the bottom profile rails is made possible by determining, for example for a first pair of angle rails, the overlap suitable for the rows of bottom profile rails and fixing it with the fixing element and, subsequently, being able to set an arbitrarily large number of rail transverse connectors to this dimension, in particular to this dimension of the overlap, and being able to fix or fasten it with the corresponding fixing elements such that only the mounting of the rail transverse connectors on the bottom profile rails has to be carried out via the fixedly predetermined fixing devices after the presetting of the length of the rail transverse connectors by correspondingly fixing the overlap by means of the fixing elements. Alternatively, the rail transverse connectors can also first be connected to the bottom profile rails on the end sides with a variable overlap and, subsequently, the relative position of the angle rails and the dimension of the overlap are fixed or set by disposing or attaching the fixing element.

According to a first advantageous embodiment of the rail transverse connectors, the angle rails may have essentially an L-profile transversely to the longitudinal direction of the rail transverse connector. Thereby, not only the necessary mechanical stability is guaranteed, but the rail transverse connectors can also exert a guiding effect in addition to their stabilizing effect. This guiding effect, for example for ballast elements, can be achieved particularly advantageously if two rows of rail transverse connectors having corresponding L-profiles are disposed in such a manner that areas of the L-profile which each project from the bottom profile rails, essentially at right angles, are oriented in such a manner parallel to each other that a guiding of ballast elements between the projecting areas of the L-profiles is made possible. In this case, the ballast elements preferably rest on areas of the angle rails which run parallel to the bottom profile rails.

According to a further, particularly advantageous embodiment of the rail transverse connectors, guiding elements for guiding the angle rails which are inserted into each other may be realized by forming end areas of at least one angle rail. Especially preferably, a formation into a tab can be provided in one end area or in both end areas of the angle rail in the profile direction or transversely to the longitudinal direction, wherein, in this case, the tab can serve to guide a second angle rail at least in the area of the overlap internally in the tab and, thus, provide a guiding effect of the formation on the end side.

Advantageously, the formations can be designed in such a manner that alternate insertion of angle rails into each other, even across more than one rail transverse connector, is made possible and, in this case, preferably a guiding is also achieved. Thus, on an inner row of bottom profile rails, two fixedly predetermined fixing devices of two adjacent rail transverse connectors, which are disposed in end areas each situated on the outside of the angle rails can in such a manner be inserted into each other and preferably disposed so as to be guided with each other that a shared fixation with or to a bottom profile rail is achieved via fixedly predetermined fixing devices brought into alignment with each other.

Furthermore, in an advantageous embodiment, the angle rails each may have an elongated hole or a slit in an end area situated on the inside, said elongated hole or slit being disposed at least partially in alignment with each other in the state of the angle rails in which they are inserted into each other, in particular to form an overlap. This makes it possible that, in addition to the fixations on the end sides with or to rows of bottom profile rails, a connection or fixation with a row of bottom profile rails can also be achieved centrally. This can be advantageous, in order to, particularly in the case of a close arrangement in a row of rows of bottom profile rails caused by the orientation of the base sides of the photovoltaic modules, be able to nevertheless enable a connection via the rail transverse connectors according to the invention and, in addition, use relatively few rail transverse connectors, since, thereby, each rail transverse connector can connect a total of three rows of bottom profile rails to each other.

According to a further preferred embodiment of the rail transverse connector, the fixing element may, in addition, be realized as a screw, pin, bolt or rivet which preferably runs through end areas and/or guiding elements of the angle rails in the overlap. When designed as a screw, for example as a self-tapping screw, the pre-mounting of the angle rails for predetermining and fixing the overlap and, thus, for predetermining and setting the length of the rail transverse connectors to match the distance of the rows of bottom profile rails can be carried out particularly easily and conveniently.

The abovementioned object is furthermore also attained by a mounting system for photovoltaic modules which has rail transverse connectors of the type described above and/or holding elements according to the description above and/or a bottom profile rail system of the presented design and/or connection elements according to the embodiments described at the beginning.

As explained above, a particularly simple and secure installation of the mounting system can be achieved by the realization of the corresponding rail transverse connectors, holding elements, bottom profile rail systems and/or connection elements, wherein the simple installation does not only refer to the installation on site or at the installation location, but also includes the shipment or the transport of the individual parts to be mounted to the installation location or mounting location.

BRIEF DESCRIPTION OF THE DRAWINGS

Below, the invention is further explained with reference to merely schematic drawings showing advantageous embodiments of the invention. In the figures.

DETAILED DESCRIPTION

Figure 1:
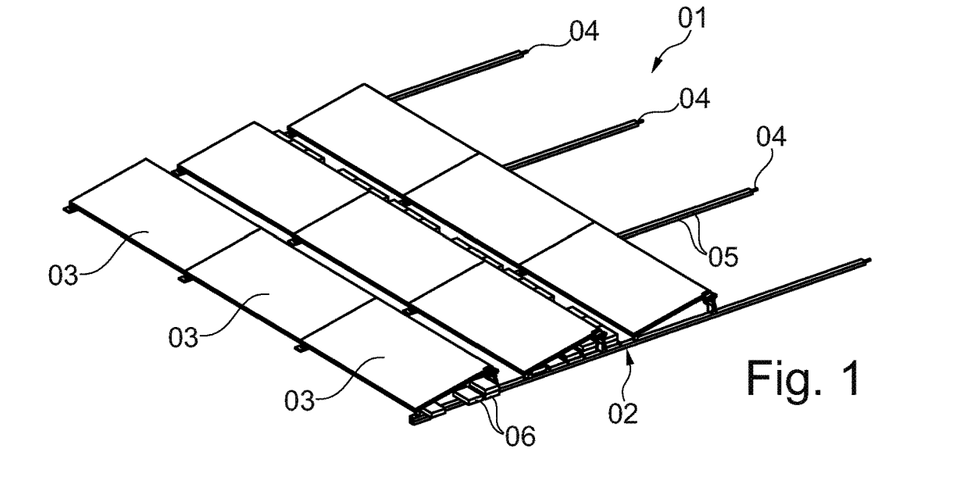
FIG. 1: shows a schematic, perspective illustration of a mounting system according to the invention together with photovoltaic modules.

FIG. 1 shows a perspective illustration of a photovoltaic system comprising a mounting system 02 and photovoltaic modules 03 disposed on the mounting system or connected to the mounting system. Several rows 04 of bottom profile rails 05 are visible. Furthermore, ballast elements 06 are visible.

Figure 2:
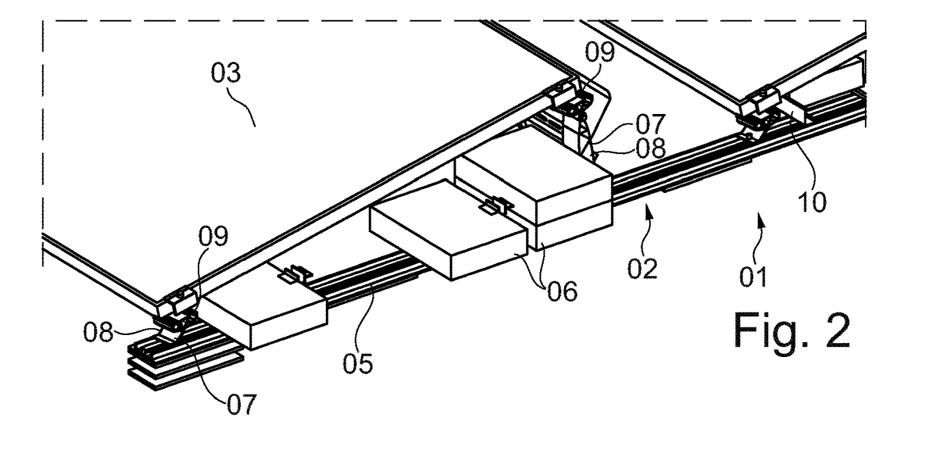
FIG. 2: shows a schematic illustration of a first enlarged detail of the illustration of FIG. 1.

In FIG. 2, an enlarged detail from photovoltaic system 01 is illustrated. In addition to ballast elements 06, holding elements 07 with which a connection or fixation between bottom profile rails 05 and photovoltaic modules 03 is established are also illustrated more clearly than in FIG. 1. Holding elements 07 are shown in two different embodiments, the differences essentially relating to a base element 08. In a first embodiment illustrated in FIG. 2 on the left, base element 08 is short. In an embodiment of holding element 07 illustrated further on the right, base element 08 is longer or taller and has a post shape or post effect.

A rocker element 09 is formed or disposed on respective base elements 08 so as to be pivotable about an axis of rotation. Furthermore, a rail transverse connector 10 is illustrated or visible in the right area of FIG. 2, said rail transverse connector 10 enabling or ensuring a transverse connection of bottom profile rails 05 disposed in rows 04.

Figure 3:
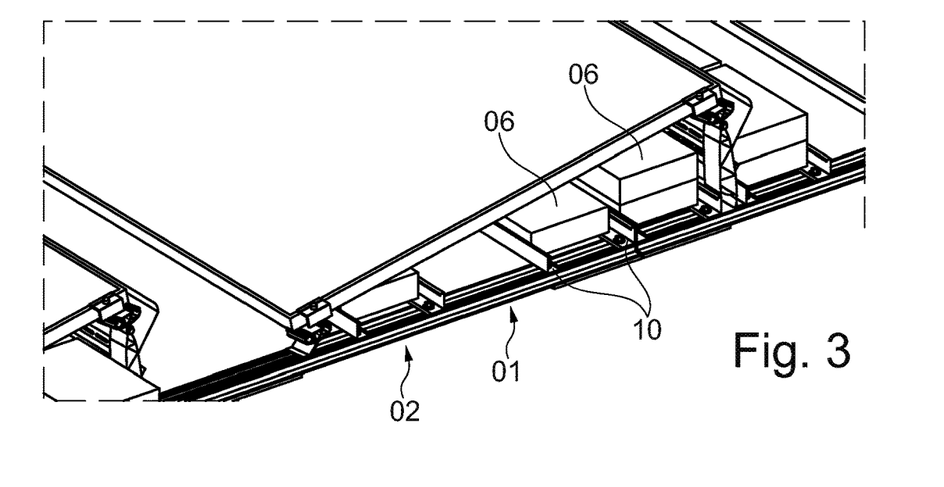
FIG. 3: shows a schematic illustration of a second enlarged detail of the illustration of FIG. 1.

FIG. 3 illustrates an alternative detail of a photovoltaic system 01 having a corresponding mounting system 02, wherein it can be seen that pairs of rail transverse connectors 10 can each be used to serve as a guide, support and/or reception of ballast elements 06, making use of the shape of the rail transverse connectors as basic angle rails having an L-profile.

Figure 4:
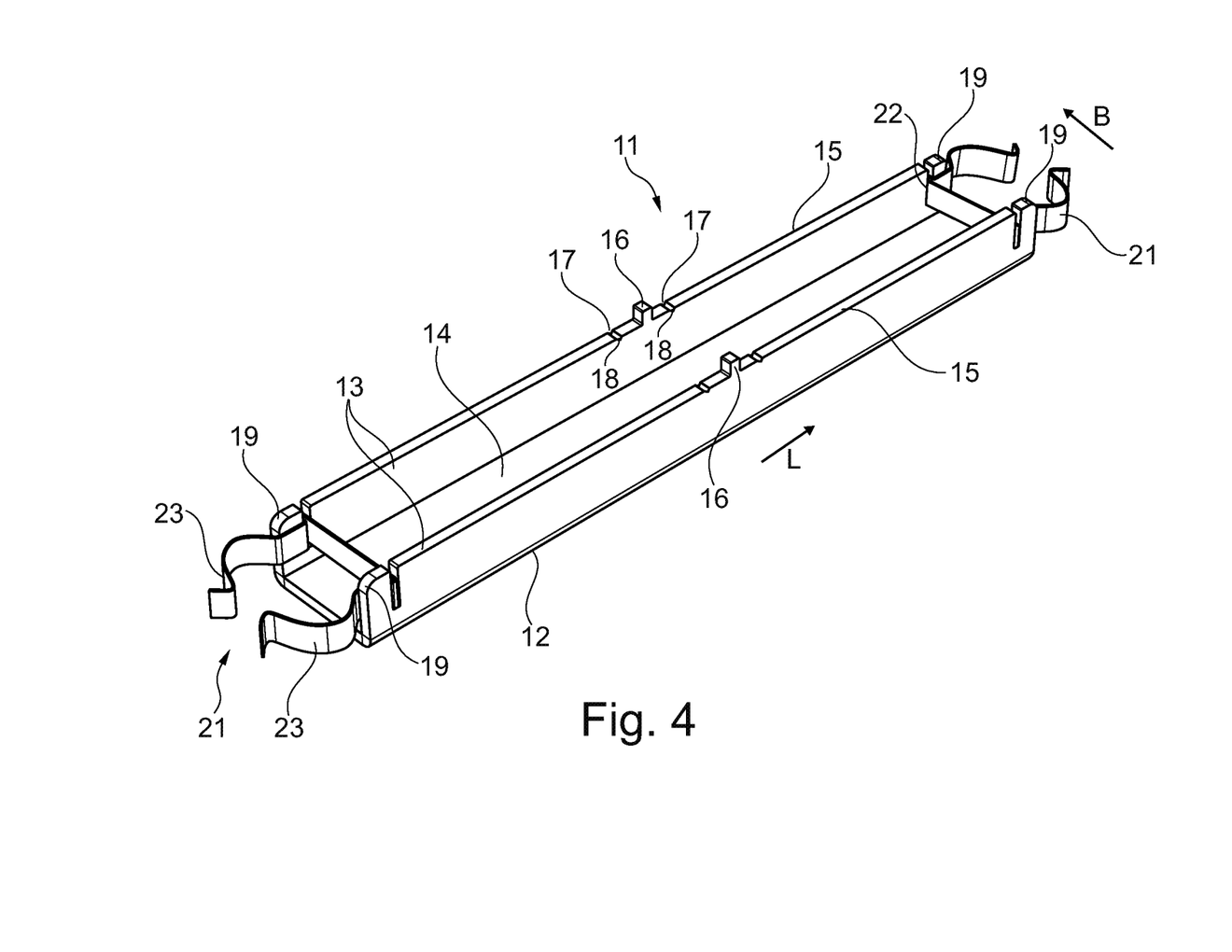
FIG. 4: shows a schematic perspective illustration of a connection element according to the invention.

FIG. 4 shows a connection element 11 according to the invention for bottom profile rails of a mounting system for photovoltaic modules. Connection element 11 comprises a base body 12 which is designed as a U-profile rail and has two parallel side legs 13 and a connection section 14 disposed between side legs 13. At a free end 15 facing away from connection section 14, side legs 13 have a projection 16 in longitudinal direction L of connection element 11 or of base body 12. Projection 16 is preferably formed integrally, in particular monolithically, with base body 12. Preferably, projection 16 and base body 12 can be made of a metallic material, especially preferably as a bent part.

Marks 17, in particular in the form of a notch 18, are formed in the longitudinal direction on both sides of projection 16.

Figure 5A:
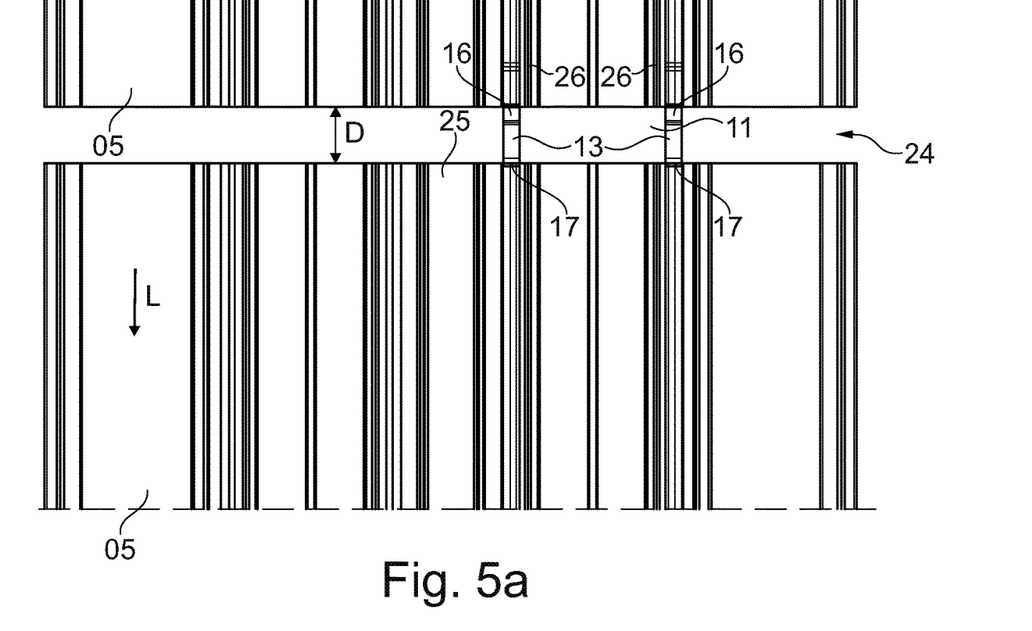
FIG. 5*a*: shows a schematic top view of a detail of a bottom profile rail system according to the invention at the transition between two bottom profile rails.
Figure 5B:
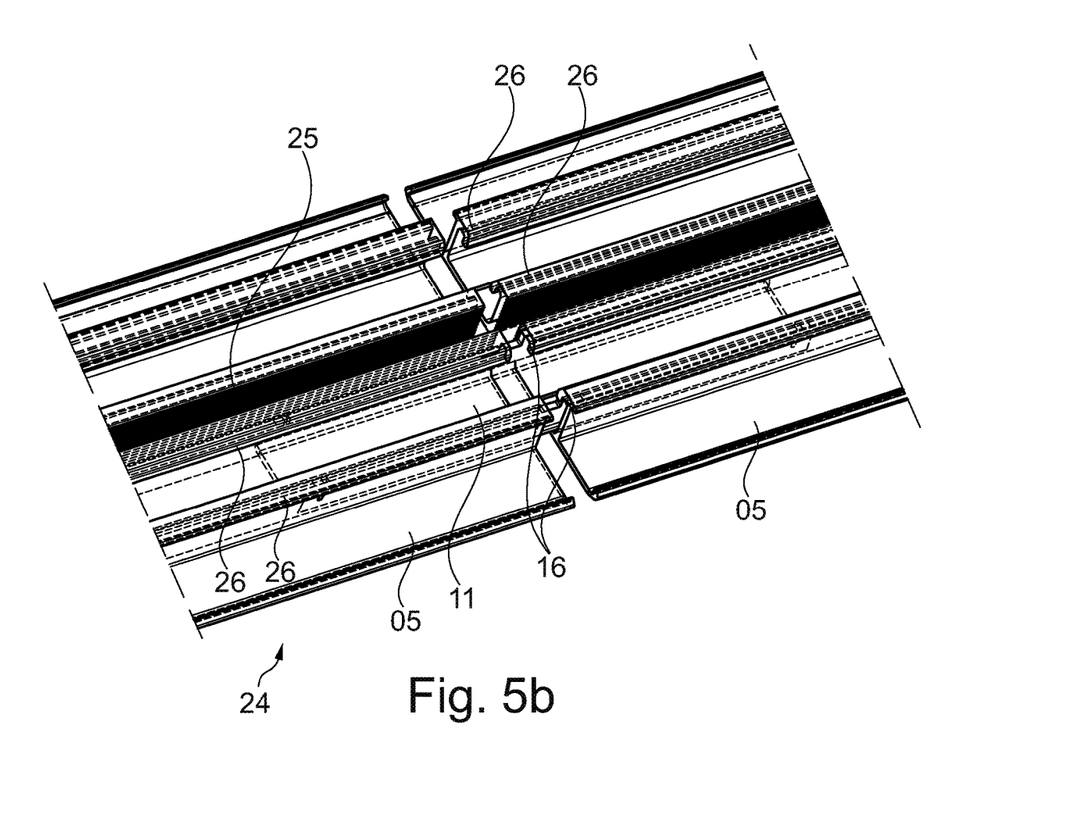
FIG. 5*b*: shows a schematic perspective view of a detail of a bottom profile rail system according to the invention at the transition between two bottom profile rails.

As will be elaborated more clearly with reference to FIGS. 5*a* and 5*b*, projection 16 is designed in such a manner that, in the mounted state, it does not project at the top beyond the wall of a channel section of a bottom profile rail into which the connection element, in particular side leg 13 of connection element 11, is inserted during the mounting. This allows holding elements for mounting or fixing photovoltaic modules to be also disposed in the transition area of two bottom profile rails without projection 16 or connection element 11 impairing or preventing this. At the same time, due to projection 16, in particular in conjunction with marks 17 or notches 18, it is made possible in a particularly simple and advantageous manner to realize an expansion joint between adjacent bottom profile rails, which compensates for the thermal expansion of the bottom profile rails and, thus, realizes a movable bearing between adjacent bottom profile rails.

Side legs 13 have a rounded portion 19 in the area of free ends 15 in the end sections in the longitudinal direction. These rounded portions 19 can improve and facilitate the insertion or introduction of connection element 11 into a bottom profile rail, in particular into channel sections of a bottom profile rail.

Furthermore, receiving indentations 20 into which a clasp element 21 is inserted are formed in the end areas or end sections of side legs 13 in the longitudinal direction. In this case, receiving indentations 20 are realized in the form of a slit 22 which extends from free end 15 in the direction of connection section 14.

Clasp elements 21 have elastically deformable side parts 23 which partially project beyond side legs 13 in a width direction B and, thus, in the mounted state, enable a pressing on the bottom profile rail, preferably the channel sections of the bottom profile rail, due to a deformation of side parts 23.

FIG. 5a shows a detail of a bottom profile rail system 24 according to the invention at the transition between two bottom profile rails 05. It can be seen that connection element 11 has been inserted or introduced on one side of a central channel 25 into corresponding channel sections 26 of bottom profile rail 05. Another connection element 11 can be provided on the other side of central channel 25, but is not illustrated in the illustration of FIG. 5a for reasons of clarity.

It can be seen that, on one side, projections 16 of side legs 13 are flush with an upper bottom profile rail 05 or are disposed edge to edge with upper bottom profile rail 05. On the opposite side of projections 16 in longitudinal direction L, adjacent bottom profile rail 05 is disposed at a distance from the end of projection 16, the distance corresponding to the distance between the end of the projection and mark 17. Thereby, a distance A is realized between bottom profile rails 05, said distance A, with the exception of the dimension of projection 16, being able to be used as an expansion joint to compensate for thermal expansion of bottom profile rail 05.

FIG. 5b shows a detail of a bottom profile rail system 24 corresponding to FIG. 5a in a perspective illustration in which, in addition to central channel 25, lateral channel sections 26 in which connection element 11 is inserted are also more clearly visible. It can be furthermore seen in the perspective view of FIG. 5b that projections 16 just do not protrude beyond channel sections 26 of bottom profile rails 05 at the top or otherwise, such that holding elements for the fixation of photovoltaic modules can in principle also be disposed in the transition area between bottom profile rails 05.

Figure 6:
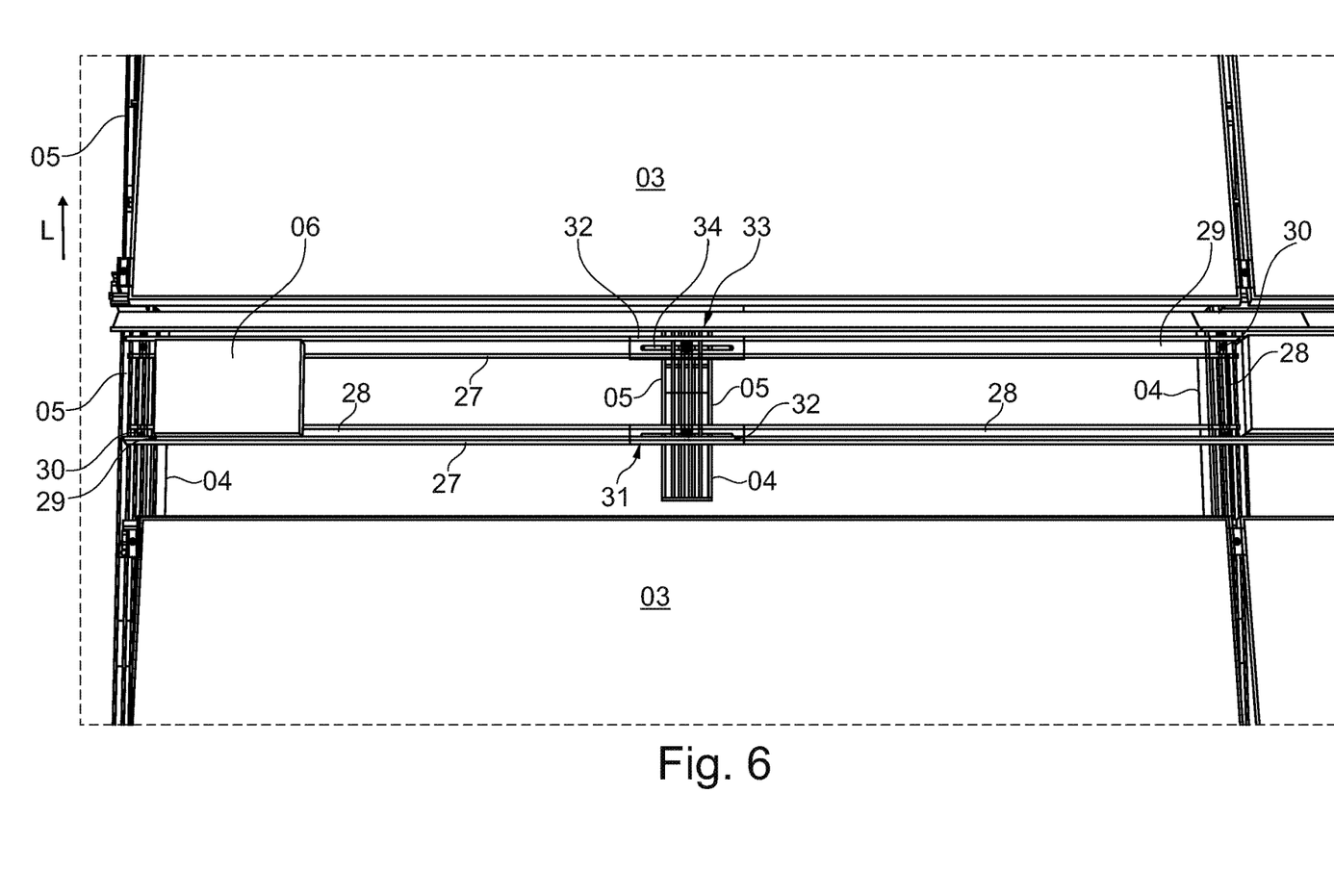
FIG. 6: shows a top view of a schematic illustration of a third enlarged detail of the illustration of FIG. 1.

FIG. 6 shows another detail of a mounting system according to the invention. In addition to mounted photovoltaic modules 03, several rows 04 are illustrated, each having several bottom profile rails 05 adjacent to each other and preferably connected to each other via connection elements according to the invention. Rail transverse connectors 27 run transversely to longitudinal direction L of bottom profile rails 05 between bottom profile rails 05. Each rail transverse connector 27 comprises a pair of angle rails 28 which are inserted into each other, the angle rails having fixedly predetermined fixing devices 30 in end areas each situated on the outside. In the example of FIG. 6, the fixing devices are preferably realized as simple hole drillings through the angle rails, preferably in conjunction with a screw bolt and/or a washer.

Fixing devices 30 are preferably screwed into central channel 25 of bottom profile rail 05 and fixed there. In order to set fixing devices 30 on both sides of rail transverse connector 27 to the distance of rows 04 of bottom profile rails 05, an overlap 31 is formed in the area of insertion into each other of angle rails 28, wherein fixing elements 32 are disposed or attached in inner overlap 31 for the fixation of the relative positions of angle rails 28 to each other.

Fixing elements 32 can, for example, be designed as a self-tapping screw which is screwed through both angle rails 28 disposed in the overlap in order to, thus, set the fixation of the relative position of angle rails 28 to each other.

As can be seen in FIG. 3 and will also become even clearer in the following with reference to FIG. 7, angle rails 28, in particular with the exception of corresponding end areas of the profile, are essentially designed as L-profiles.

Furthermore, it is shown in FIG. 6 that each angle rail has an elongated hole 34 in an inner end area 33, two elongated holes 34 of two angle rails 28 being designed and disposed in such a manner that, in the state of insertion into each other of angle rails 28, at least a partial alignment of elongated holes 34 is achieved, which, in the illustration of FIG. 6, leads to the fact that a fixation with or to another bottom profile rail 05 or a row 04 of bottom profile rails 05 is made possible via further fixing devices. In the illustration of FIG. 6, it is visible that middle row 04 of bottom profile rails 05 has basically no real technical relevance or significance, but that it merely serves to illustrate the purpose of elongated holes 34 and of the inner end area of angle rails 28. However, middle row 04 of bottom profile rails 05 can well be technically relevant if photovoltaic modules 03 are not oriented with their short side parallel to longitudinal direction L of the bottom profile rails as illustrated in FIG. 6, but are, rotated by 90 degrees, oriented with a long side of photovoltaic modules 03 parallel to the longitudinal direction of rows 04 of bottom profile rails. In this case, the additional, inner row 04 of bottom profile rails 05 can be used to allow a correspondingly reduced distance of the holding elements.

FIG. 6 also shows that angle rails 28, also due to their advantageously essentially L-shaped profile, are particularly well suited to serve in pairs as a guide and reception for ballast elements 06 when angle rails 28 are disposed as shown in FIG. 6, for example.

Figure 7:
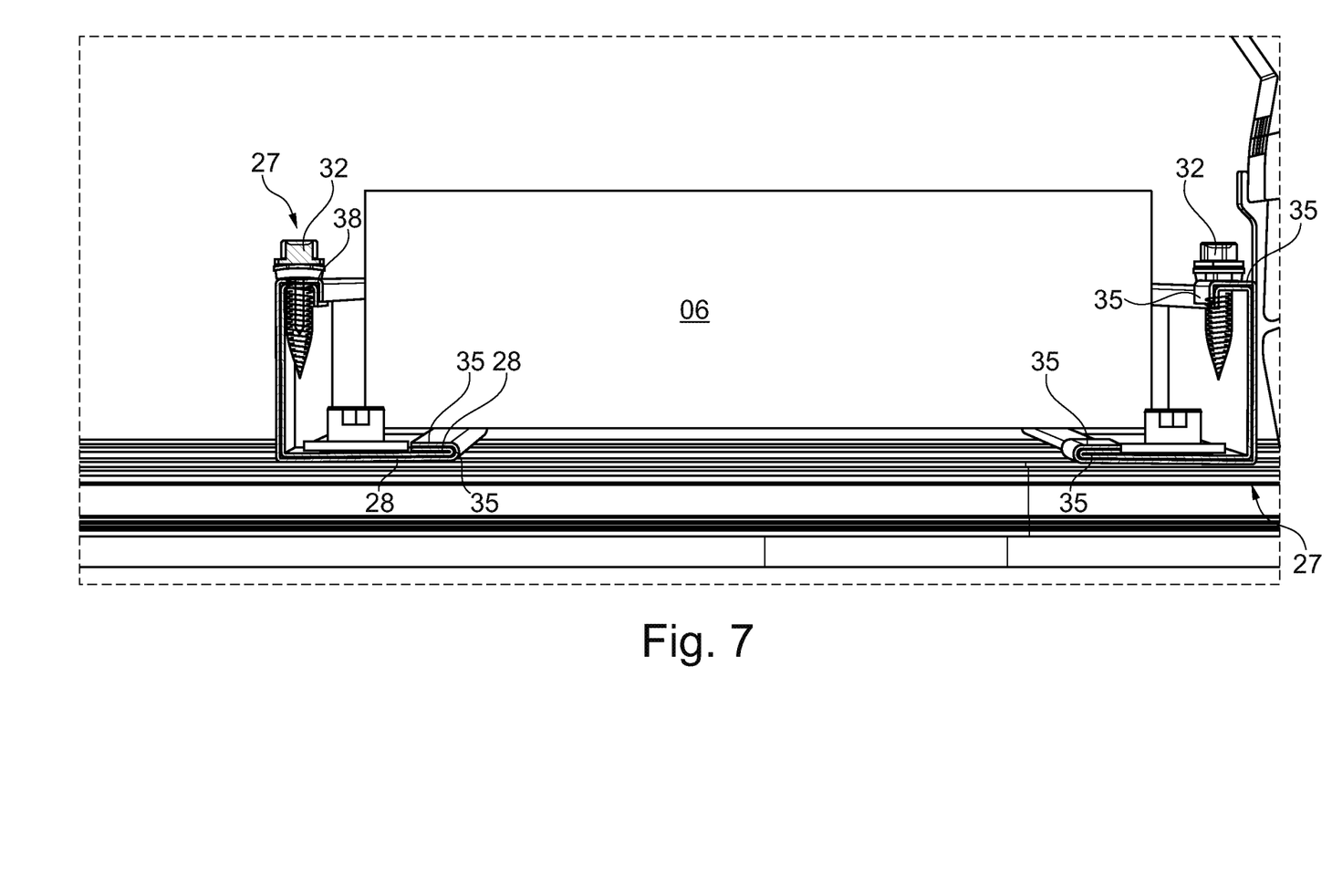
FIG. 7: shows a schematic illustration of a section through two rail transverse connectors according to the invention at the level of the fixing elements.

FIG. 7 shows a section through two rail transverse connectors 27 at the level of fixing elements 32. In the section of rail transverse connectors 27, it can be seen that two angle rails 28 are inserted into each other, angle rails 28 basically having an L-shaped profile. In addition, a guide and associated guiding elements 35 are realized in the sections of the profile which are on the end sides or are situated on the outside by a formation of end areas, guiding elements 35 facilitating the insertion of angle rails 28 of rail transverse connectors 27 into each other and their displacement relative to each other. It can be seen that fixing elements 32 run through guiding elements 35 in order to enable a better fixation of angle rails 28 with respect to each other.

The guiding elements also allow angle rails 28 to be inserted into each other and to be mutually guided in the transition area of two rail transverse connectors, as shown, for example, in the right-hand area of FIG. 6. Thereby, with a corresponding arrangement of angle rails 28 in alternating sequence, any number of rail transverse connectors can be disposed one behind the other.

In FIG. 7, it is also visible how angle rails 28 of rail transverse connectors 27 serve as a reception or guide for possible ballast elements 06 by ballast elements 06 partly resting on angle rails 28 and partly being guided laterally by angle rails 28.

Figure 8:
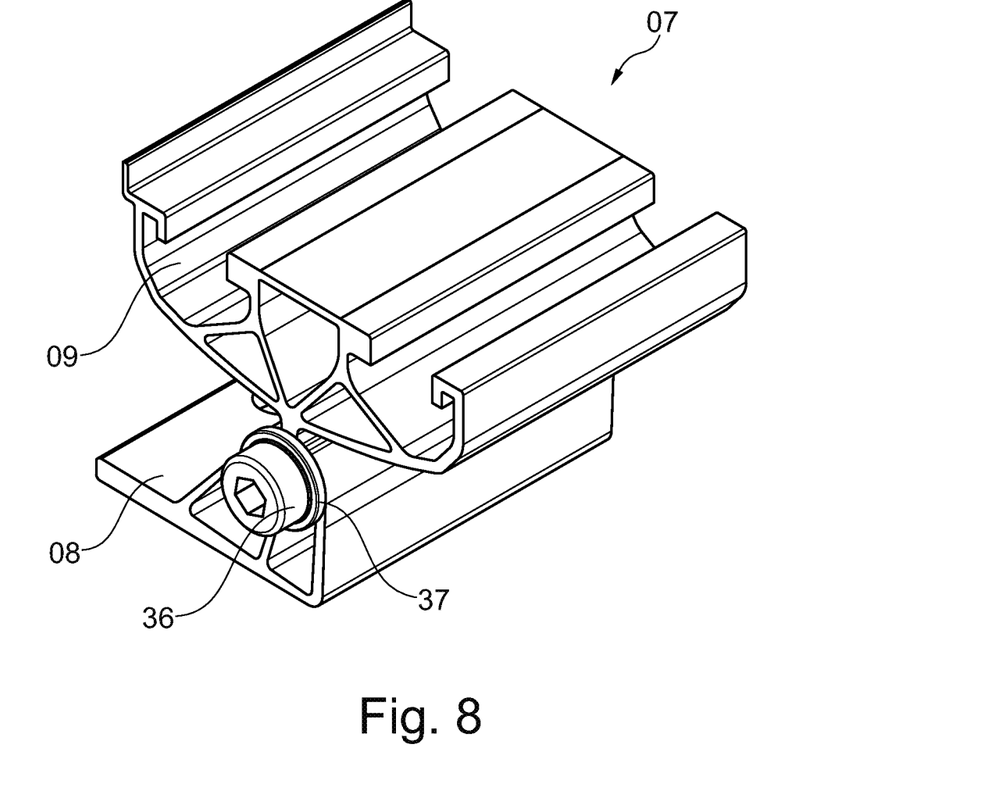
FIG. 8: shows a schematic perspective illustration of a holding element according to the invention.

FIG. 8 shows a perspective view of a holding element 07 comprising a base element 08 and a rocker element 09. Base element 08 serves to connect a photovoltaic module to a bottom profile rail. Rocker element 09 is mounted in a pivotable manner about a pivoting axis 36 relative to base element 08. As illustrated in FIG. 8, pivoting axis 36 can be designed as a bolt, for example a screw bolt, having a head on the end side, for example, a head with a hexagon socket.

Holding element 07 comprises a preload element 37 which interacts with base element 08 and/or rocker element 09 in such a manner that, when rocker element 09 is accelerated only by the weight, a rotation of rocker element 09 with respect to base element 08 is prevented and that, in case of an additional acceleration, in particular by an application of a force by hand or without tools, an adjustment, preferably a stepless adjustment, of rocker element 09 with respect to base element 08 is made possible. In the example of FIG. 8, the preload element is designed as an O-ring, for example, of plastic or hard rubber and causes a clamping effect on the rocker element. In this case, the O-ring of preload element 37 is disposed concentrically to pivoting axis 36 and preferably in both end areas of preload element 37. Preload element 37 runs radially circumferentially about pivoting axis 36. FIG. 8 shows a short holding element with a correspondingly short base element 08; as explained by way of introduction with reference to FIG. 2, holding element 07 can also be designed with a correspondingly long, post-shaped base element 08 without this having any impact on the realization or effect of preload element 37.

LIST OF REFERENCE SIGNS

- 01 photovoltaic system
- 02 mounting system
- 03 photovoltaic modules
- 04 rows
- 05 bottom profile rails
- 06 ballast elements
- 07 holding element
- 08 base element
- 09 rocker element
- 10 rail transverse connector
- 11 connection element
- 12 base body
- 13 side legs
- 14 connection section
- 15 free end
- 16 projection
- 17 marks
- 18 notch
- 19 rounded portions
- 20 receiving indentations
- 21 clasp element
- 22 slit
- 23 side parts
- 24 bottom profile rail system
- 25 central channel
- 26 channel sections
- 27 rail transverse connector
- 28 angle rails
- 29 end areas
- 30 fixing devices
- 31 overlap
- 32 fixing element
- 33 end area
- 34 elongated hole
- 35 guiding elements
- 36 pivoting axis
- 37 preload element
- L longitudinal direction
- B width direction

The invention claimed is:

1. A connection element (11) for bottom profile rails of a mounting system for photovoltaic modules, comprising:
a base body (12) realized as a U-shaped profile rail and having two parallel side legs (13) and a connection section (14), wherein both side legs (13) have a projection (16) on a free end (15) facing away from the connection section (14), said projection (16) being realized with the base body (12), wherein, in a mounted state, the side legs (13) are guided in channel sections (26) of the bottom profile rail (05) in such a manner that a wall of the channel sections (26) runs above the free ends (15) of the side legs (13), wherein the projection (16) is realized in such a manner that the projection (16) does not project at a top beyond the wall of the channel sections (26) in the mounted state.

2. The connection element according to claim 1, wherein
the free end (15) of the side legs (13) has a mark (18) on one side in a longitudinal direction at a predetermined distance from the projection (16).

3. The connection element according to claim 1, wherein said projection (16) is monolithic with the base body (12), and wherein the wall of the channel sections (26) runs above and adjacent to the free ends (15).

4. The connection element according to claim 1, wherein
the base body (12) has a receiving opening or receiving indentation (20) in end sections of the side legs (13) in the longitudinal direction, said receiving opening or receiving indentation (20) serving to receive a clasp element (21).

5. The connection element according to claim 4, wherein
the receiving opening or receiving indentation (20) extends from the free end (15) of the side legs (13) in the direction of the connection section (14).

6. The connection element according to claim 4, wherein the clasp element (21) inserted into the receiving opening or receiving indentation (20) and projecting in a width direction at least partially beyond the side legs (13) with elastically deformable side parts (23), in the mounted state, provides a pressing of the side parts (23) on the bottom profile rail (05) due to a deformation of the side parts (23) by means of the bottom profile rail (05).

7. A bottom profile rail system (24) of a mounting system for photovoltaic modules, comprising:
at least two rows of bottom profile rails serving for fixation of holding elements for holding photovoltaic modules, wherein each row of bottom profile rails comprises at least two bottom profile rails,
wherein the connection element (11) according to claim 1 is disposed between each two adjacent bottom profile rails (05).

8. The bottom profile rail system according to claim 7, wherein in an initial mounting state, the connection element (11) is disposed in such a manner that the projection (16) adjoins in a flush manner with a respective said bottom profile rail (05) on one side and wherein, on another side of the projection (16), a respective said bottom profile rail (05) ends at or in an area of mark (17).

9. The bottom profile rail system according to claim 7, further comprising a removable distance gauge which is positioned on one side of the projection (16) on or at the connection element (11) during the initial mounting and is an auxiliary stop for a respective said bottom profile rail (05) in order to ensure a predetermined distance between the projection (16) of the connection element (11) and an adjacent respective said bottom profile rail (05) in a longitudinal direction.

10. A mounting system for photovoltaic modules comprising:
   (a) a rail transverse connector (10, 27) comprising a pair of angle rails which are inserted into each other in a longitudinal direction, wherein the angle rails (28) have a fixedly predetermined fixing device (30) in end areas (29, 33) each situated on an outside thereof for connection to a respective said bottom profile rail (05) and wherein a variable overlap (31) of the angle rails (28) which are inserted into each other for predetermining a length of the rail transverse connectors (10, 27) is set by means of a fixing element (32) for fixing a relative position of the angle rails (28) to each other in an area of the overlap (31) situated on an inside thereof;
   (b) a holding element (07) having a base element for being connected to a respective said bottom profile rail and a rocker element, which is mounted with respect to the base element so as to be pivotable about a pivoting axis (36), for being connected to a respective photovoltaic module of a plurality of photovoltaic modules, further comprising a preload element (37) which interacts with the base element (08) and the rocker element (09) in such a manner that, when the rocker element (09) is accelerated only by weight, a rotation of the rocker element (09) with respect to the base element (08) is prevented and wherein, in case of an additional acceleration, an adjustment of the rocker element (09) with respect to the base element (08) is made possible; and
   (c) a bottom profile rail system (24) comprising at least two rows of bottom profile rails serving for fixation of holding elements for holding photovoltaic modules, wherein each row of bottom profile rails comprises at least two bottom profile rails, wherein the connection element (11) according to claim 1 is disposed between each two adjacent bottom profile rails (05).

11. The mounting system according to claim 10, wherein the preload element (37) is designed in such a manner that a clamping effect is exerted at least on the rocker element (09).

12. The mounting system according to claim 10, wherein the preload element (37) is disposed concentrically to the pivoting axis (36).

13. The mounting system according to claim 10, wherein a respective said preload element is disposed on both sides of the pivoting axis (36).

14. The mounting system according to claim 10, wherein the preload element (37) is provided radially circumferentially about the pivoting axis (36).

15. The mounting system according to claim 10, wherein the angle rails (28) have a substantially L-shaped profile.

16. The mounting system according to claim 10, further comprising guiding elements (35) for guiding the angle rails (28) which are inserted into each other, said guiding elements (35) being realized by forming end areas (29, 33) of at least one angle rail (28).

17. The mounting system according to claim 10, wherein the angle rails (28) each have an elongated hole (34) or a slit in an end area (29, 33) situated on the inside, said elongated hole (34) or slit being disposed at least partially in alignment with each other in an insertion state into each other.

18. The mounting system according to claim 10, wherein the fixing element (32) is realized as a screw, pin, bolt or rivet which runs through at least one of end areas (29, 33) or guiding elements (35) of the angle rails (28) in the overlap (31).

\* \* \* \* \*